United States Patent Office 2,877,418
Patented Mar. 10, 1959

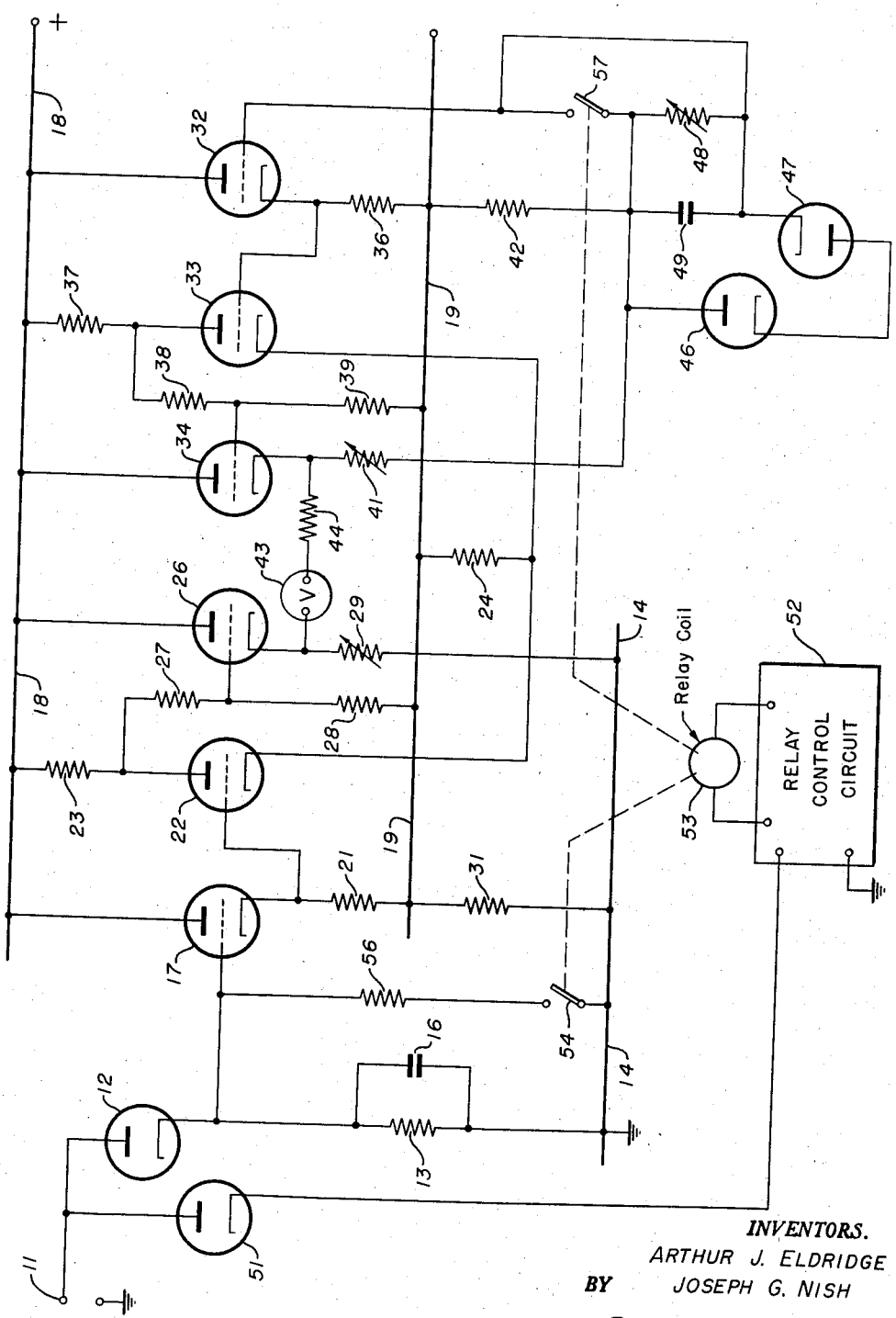

2,877,418
VACUUM TUBE VOLTMETER

Arthur J. Eldridge, San Jose, and Joseph G. Nish, Concord, Calif., assignors, by mesne assignments, to the United States of America as represented by the United States Atomic Energy Commission Application February 3, 1955, Serial No. 486,040

1 Claim. (Cl. 324—123)

The present invention relates to vacuum tube voltmeters and, more particularly, to an improved vacuum tube voltmeter for measuring the amplitude of very short duration voltage pulses.

One method for accurately measuring the amplitude of transient, short duration pulses uses oscillographic equipment together with synchronized photographic means. Such system has the inherent disadvantages of requiring bulky and complicated equipment, as well as requiring a time delay while the film is being developed.

To use a conventional type of vacuum tube voltmeter, a hold circuit must be included so that the peak value of a transient voltage is retained long enough for an operator to note the voltage value or a recorder to indicate the same. In the present instance, it is desired to have a voltmeter which responds to direct current voltages, as well as to frequencies up to several megacycles, and to satisfy such conditions, it is necessary to use direct coupled circuits. It is difficult to maintain a stable zero setting with a direct current reading vacuum tube voltmeter, since a direct current amplifier is particularly susceptible to the deleterious effects of line voltage variations and component aging. The present invention was developed with particular attention to the problem of stability.

Therefore, it is an object of the present invention to provide a voltmeter having maximum zero setting stability.

It is another object of the present invention to provide accurate measurement of voltage pulses of short duration.

It is another object of the present invention to provide a transient reading voltmeter that will automatically return to a zero indication after a short time interval.

It is still a further object of the invention to provide a voltmeter having an output signal suitable for connection to a recording potentiometer.

The invention, both as to its organization and method of operation, together with further objects and advantages thereof, will best be understood by reference to the following specification taken in conjunction with the accompanying drawing in which there is shown one preferred embodiment of the invention in schematic form.

Referring now to the drawing, there is shown an input terminal 11, adapted for convenient connection to a source of unknown potential. An input diode 12 has the plate connected to the input terminal 11. Input voltages applied to the input terminal 11 are rectified by the input diode 12, the positive portion of the input signal appearing across an input resistor 13. The input resistor 13 couples the cathode of the input diode 12 to a ground potential bus 14, and is in parallel with an input capacitor 16 which is charged to the peak value of voltage appearing across the input resistor.

The voltage across the input capacitor 16 is applied to the control grid of a first cathode follower tube 17 from the cathode of the input diode 12 by a connection therebetween. The plate of the cathode follower tube 17 is directly connected to a positive potential bus 18 while the cathode is coupled to a negative potential bus 19 through a cathode resistor 21. The control grid of a first amplifying tube 22 is directly connected to the cathode of the first cathode follower tube 17. The plate of the first amplifying tube 22 is coupled to the positive potential bus 18 by a plate resistor 23 and the cathode is coupled to the negative voltage bus 19 through a common cathode resistor 24. Voltage signals are coupled from the plate of the first amplifying tube 22 to the control grid of a first voltmeter tube 26 by a coupling resistor 27. The control grid of the first voltmeter tube 26 is coupled to the negative potential bus 19 through a grid resistor 28 while the plate is directly connected to the positive potential bus 18.

The cathode of the first voltmeter tube 26 is connected to the ground potential bus 14 by a full scale variable resistor 29. The cathode circuit is completed back to the negative potential bus 19 through a feedback resistor 31. The voltage drop across the feedback resistor 31 has the effect of negative feedback applied to the first cathode follower tube 17.

A second cathode follower tube 32, a second amplifying tube 33, and a second voltmeter tube 34 with associated circuits are substantially identical to the first cathode follower 17, the first amplifying tube 22, and the first voltmeter tube 26 with the associated circuits. A cathode resistor 36 couples the cathode of the second cathode follower tube 32 to the negative potential bus 19 while the plate is connected directly to the positive potential bus 18. The control grid of the second amplifying tube 33 is connected to the cathode of the second cathode follower tube 32. The cathode of the second amplifying tube 33 is directly connected to the cathode of the first amplifying tube 22, the common cathode resistor 24 coupling both tubes to the negative potential bus 19.

The plate of the second amplifying vacuum tube 33 is coupled to the positive potential bus 18 by a plate resistor 37. Voltages at the plate of the second amplifying tube 33 are coupled to the control grid of the second voltmeter tube 34 by a coupling resistor 38. A grid resistor 39 couples the control grid of the second voltmeter tube 34 to the negative potential bus 19 while the plate is connected directly to the positive potential bus 18. One end of a zero adjust potentiometer 41 is connected to the cathode of the second voltmeter tube 34. A feedback resistor 42 connected in series with the zero adjust potentiometer 41 causes a negative feedback voltage to be applied to the second cathode follower tube 32. A direct current voltmeter 43 connected in series with a meter resistor 44 is connected between the cathode of the first voltmeter tube 26 and the second voltmeter tube 34.

The first described portion of the circuit (the first cathode follower tube 17, the first amplifying tube, the first voltmeter tube 26, and the associated circuits) serve the function of isolating and amplifying voltages developed across the input capacitor 16. The first cathode follower tube 17 isolates the input resistor 13 and the input capacitor 16 combination so that a potential developed across the resistor 13 is undisturbed by associated circuit conditions.

The portion of the circuit comprising the second cathode follower 32, the second amplifying tube 33, the second voltmeter tube 34 and the associated component parts serves the purpose of maintaining the zero reading of the voltmeter stable with changes in operating voltage. The first cathode follower 17 and the second cathode follower 32 are preferably contained in the same tube envelope, and similarly the first and second amplifying tubes 22, 33, as well as the first and second voltmeter tubes 26, 34. Thus changes in emission characteristics in a tube due to line voltage changes or tube aging are counterbalanced so that the resultant variation is negligible.

The accuracy of the voltage measurements is affected by the contact potential developed across the input diode 12, the value of the contact potential depending upon the materials used in the construction of the plate and cathode. To balance out such contact potential a counterbalancing voltage is applied to the control grid of the second cathode follower 32. The counterbalancing voltage is obtained from the contact potentials of two series connected diodes, the cathode of a first balance diode 46 being connected to the plate of a second balance diode 47. The plate of the first balance diode 46 is connected to the junction of the feedback resistor 42 and the zero adjust potentiometer 41. The cathode of the second balance diode 47 is connected to the control grid of the second cathode follower tube 32. An adjustable balance resistor 48 for controlling the value of the contact potential voltage applied to the control grid of the second cathode follower tube 32 is connected from the cathode of the second balance diode 47 to the plate of the first balance diode 46. A bypass capacitor 49, connected in parallel with the adjustable balance resistor 48, is provided for filtering any transient impulses wihch may be present.

An additional circuit is provided so that when a transient input voltage pulse is impressed at the input terminal 11, after approximately one second the input capacitor 16 is shorted and the circuit is ready to receive subsequent input pulses. If the voltmeter 43 is a recording potentiometer, in the absence of the shorting function the voltmeter 43 would indicate the decay curve of the input resistor 13 and the input capacitor 16, possibly leading to misinterpretation by an operator. Such shorting circuit is provided by connecting the plate of a control diode 51 to the input terminal 11 and the cathode to a conventional relay control circuit 52, (shown in block form on the drawing). Connected to the relay control circuit 52 is a relay coil 53, which operates a first contact arm 54 connected in series with a current limiting resistor 56 between the control grid of the first cathode follower 17 and the ground potential bus 14. The relay coil 53 also operates a second contact arm 57 connected in parallel with the adjustable balance resistor 48. The relay coil 53, shown in the de-energized position, is normally energized until a voltage is applied to the input terminal 11 and rectified by the control diode 51. The rectified input voltage is applied to the relay control circuit 52 which prevents a current flow through the relay 53 to open the first and second contact arms 54 and 57.

After the cessation of an input signal, there is a time delay of approximately one second before the relay 53 is energized, coupling the control grid of the first cathode follower to ground and shorting out the contact potential voltage developed by the first and second balance diodes 46 and 47. Such action causes the meter 43 to indicate zero volts. With the input capacitor 16 discharged the instrument is ready to receive a subsequent input pulse which might otherwise be masked if a potential existed at the cathode of the input diode 12.

In summary of the operation of the device, assume that a voltage pulse is applied to the input terminal 11. The voltage is rectified by the control diode 51 and applied to the relay control circuit 52 whereby the relay coil 53 is de-energized. The contact arm 54 is opened and the input capacitor 16 is thereby allowed to charge to the peak value of the input voltage pulse. Since there is no control grid current at the first cathode follower tube 17 the input capacitor 16 accurately maintains the peak value of input voltage for a considerable time period after cessation of the input voltage, the resistance value of the input resistor 13 in this embodiment being of such value as to provide a long period time constant. The voltage across the input capacitor 16 is then isolated by the first cathode follower tube 17, amplified by the first amplifier tube 22 and applied to one side of the voltmeter 43 by the first voltmeter tube 26.

In a like manner the contact potential voltage developed by the first and second balance diodes 46 and 47 is isolated by the second cathode follower 32, amplified by the second amplifier tube 33, and applied to the other side of the voltmeter 43 through the second voltmeter tube 34.

When the circuit is being calibrated, the relay coil 53 is energized so that the contact arms 54 and 57 are closed. The zero adjust potentiometer is then set so that the meter 43 indicates zero. The relay coil 53 is then de-energized so that the contact arms 54 and 57 are open. With no voltage applied to the input terminal 11 the adjustable balance resistor is varied until the contact potential of the input diode 12 is balanced and the meter 43 again indicates a zero reading. With a known standard voltage applied to the input terminal 11 the full scale variable resistor 29 may be set to calibrate the meter 43.

So that the device may be made more versatile a switching means may be included so that various voltage ranges may be measured and the time constant of the input resistor 13 and the input capacitor 16 combination may be changed. A variable time constant is useful in instances where the present invention is to be used at both high and low frequencies or where it is occasionally desired to retain a reading on the meter 43 for a long time after cessation of an input potential.

The device has a low output impedance suitable for use with a recording potentiometer connected in parallel with the voltmeter 43.

In the present instance, an ungrounded power supply is provided to furnish operating potentials for the device so that negative feedback voltages are developed across the feedback resistor 31. To prevent interaction between circuits, operating potentials for the relay control circuit are provided from a separate power supply (not shown).

While the invention has been disclosed with respect to a single preferred embodiment, it will be apparent to those skilled in the art that numerous variations and modifications may be made within the spirit and scope of the invention and thus it is not intended to limit the invention except as defined in the following claim.

What is claimed is:

In an electronic voltmeter the combination comprising first and second input terminals for receiving input potential pulses to be measured, said second terminal connected to ground, an input diode having its anode connected to said first input terminal, a parallel resistance-capacitance charging network connected between the cathode of said diode and ground, a first cathode follower amplifier having an input coupled to the cathode of said input diode, positive anode and negative cathode bias terminal means respectively coupled to said first cathode follower amplifier, a first feedback resistor connected between said negative cathode bias means and ground, first and second balance diodes with the cathode of the first and second balance diodes with the cathode of the second diode, a second diode connected to the anode of the second diode, a second parallel resistance-capacitance charging network connected between the anode of said first and cathode of said second balance diodes, a second cathode follower amplifier having an input coupled to the cathode of said second balance diode, said second cathode follower amplifier coupled to said positive anode and negative cathode bias terminal means, a second feedback resistor connected between said negative cathode bias terminal means and the anode of said first balance diode, first and second direct coupled amplifiers respectively coupled to said positive bias terminal means and having a common cathode resistor connected to said negative cathode bias terminal means, said first and second direct coupled amplifiers having inputs respectively coupled to the outputs of said first and second cathode followers amplifiers, a third cathode follower amplifier having an adjustable load resistor connected to ground and having an input coupled to the output of said first direct coupled amplifier, said third cathode follower amplifier coupled to said positive anode bias terminal means, a fourth cathode follower amplifier having an adjustable load resistor connected to the anode of said first balance diode and having an input coupled to the output of said second direct coupled amplifier, said fourth cathode follower amplifier coupled to said positive anode bias terminal means, potential amplitude indicating means coupled between the adjustable load resistors of said third and fourth cathode follower amplifiers, a relay having first and second normally open contacts respectively coupled in parallel with said first and second charging networks, a control diode having its anode connected to said first input terminal, and a relay control circuit coupled between the cathode of said control diode and said relay to normally energize same and close the contacts thereof, said control circuit de-energizing said relay in response to each positive one of said pulses applied to said input terminals and re-energizing said relay after a short fixed time delay initiated upon termination of each pulse.

References Cited in the file of this patent

UNITED STATES PATENTS

| | | |
|---|---|---|
| 2,316,044 | Blair | Apr. 6, 1943 |
| 2,472,209 | Hall | June 7, 1949 |
| 2,577,499 | Anderson | Dec. 4, 1951 |
| 2,582,676 | Bordewieck et al. | Jan. 15, 1952 |
| 2,613,235 | Grunsky | Oct. 7, 1952 |
| 2,637,786 | Bordewieck | May 5, 1953 |
| 2,697,782 | Lawson | Dec. 21, 1954 |
| 2,716,162 | Pearlman | Aug. 23, 1955 |